(12) United States Patent
Thelin

(10) Patent No.: US 6,845,405 B1
(45) Date of Patent: Jan. 18, 2005

(54) DISK DRIVE EXECUTING PART OF A LINKED DISK COMMAND

(75) Inventor: Gregory B. Thelin, Garden Grove, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/329,166

(22) Filed: Dec. 24, 2002

(51) Int. Cl.[7] ............................ G06F 13/14; G11B 5/58
(52) U.S. Cl. ............................. 710/6; 710/5; 710/39; 710/74; 711/112; 711/113; 369/53.1; 369/53.41; 369/53.42
(58) Field of Search ............................. 711/133, 156, 711/111, 112, 154, 113; 710/5, 6, 33, 35, 52, 39, 74; 369/53.1, 53.41, 53.42

(56) References Cited

U.S. PATENT DOCUMENTS

| | | | |
|---|---|---|---|
| 4,888,691 A | | 12/1989 | George et al. |
| 5,381,539 A | * | 1/1995 | Yanai et al. .................. 711/133 |
| 5,729,718 A | * | 3/1998 | Au .................................. 710/39 |
| 5,991,825 A | | 11/1999 | Ng |
| 6,272,565 B1 | | 8/2001 | Lamberts |
| 6,711,628 B1 | * | 3/2004 | Thelin .............................. 710/6 |
| 2004/0034750 A1 | * | 2/2004 | Horn ............................ 711/156 |

* cited by examiner

*Primary Examiner*—Jeffrey Gaffin
*Assistant Examiner*—Joshua D Schneider
(74) *Attorney, Agent, or Firm*—Milad G. Shara, Esq.; Won Tae C. Kim, Esq.; Howard Sheerin, Esq.

(57) ABSTRACT

A disk drive is disclosed which links disk commands that access near sequential data sectors. The linked and non-linked disk commands are inserted into an input/output queue and selected for execution according to a rotational position optimization (RPO) algorithm. If an error occurs while executing a linked disk command, the disk commands are unlinked and at least one of the unlinked disk commands is executed. The residual unlinked disk commands are inserted back into the input/output queue for later execution in an order determined by the RPO algorithm.

26 Claims, 6 Drawing Sheets

DISK DRIVE EXECUTING PART OF A LINKED DISK COMMAND

BACKGROUND OF THE INVENTION

1. Field of the Invention

The present invention relates to disk drives. More particularly, the present invention relates to a disk drive executing part of a linked disk command.

2. Description of the Prior Art

Figure 1A:
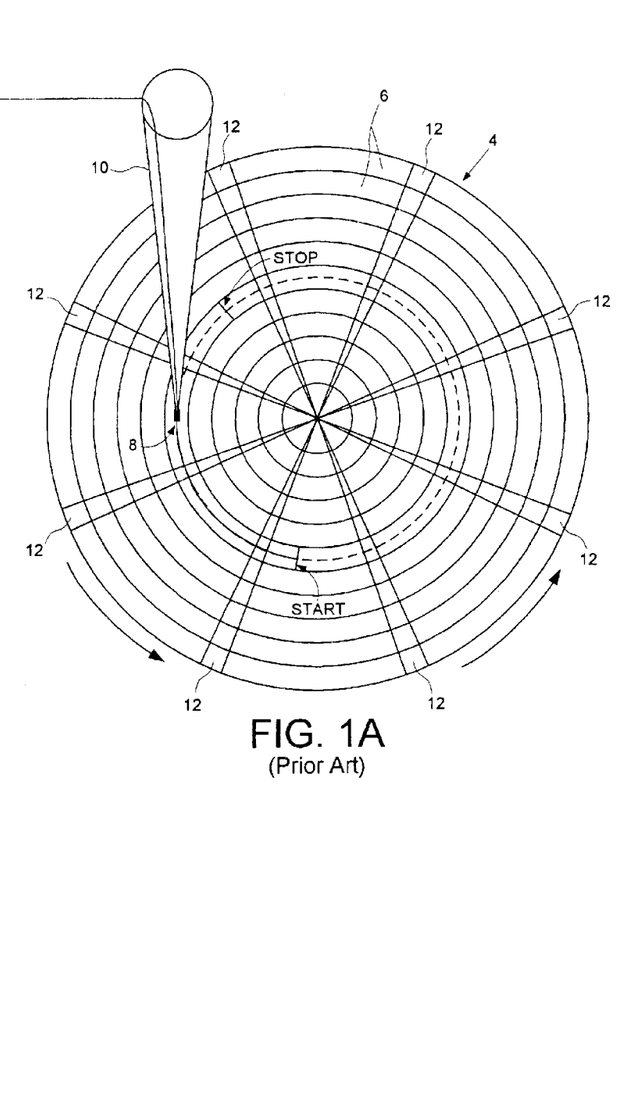
FIG. 1A shows a prior art disk drive comprising a disk having a plurality of tracks and a head actuated radially over the disk.

FIG. 1A shows a prior art disk drive 2 comprising a disk 4 having a plurality of concentric tracks 6. Each track 6 is partitioned into a number of data sectors for storing user data. A head 8 is connected to a distal end of an actuator arm 10 which is rotated about a pivot in order to actuate the head 8 radially over the disk 4. The disk 4 further comprises a plurality of embedded servo sectors 12 processed to maintain the head 8 over the centerline of a target track during read and write operations.

A disk controller 14 controls the operation of the disk drive 2 by executing read and write commands received from a host computer. Commands received from the host are converted into disk commands (read/write commands) that are inserted into an input/output (I/O) queue and executed according to a rotational position optimization (RPO) algorithm. The RPO algorithm is used by the disk controller 14 to select the disk commands from the I/O queue in an order that optimizes performance with respect to the mechanical latencies of the disk drive, including the seek latency of the head 8 and the rotational latency of the disk 4.

Figure 1B:
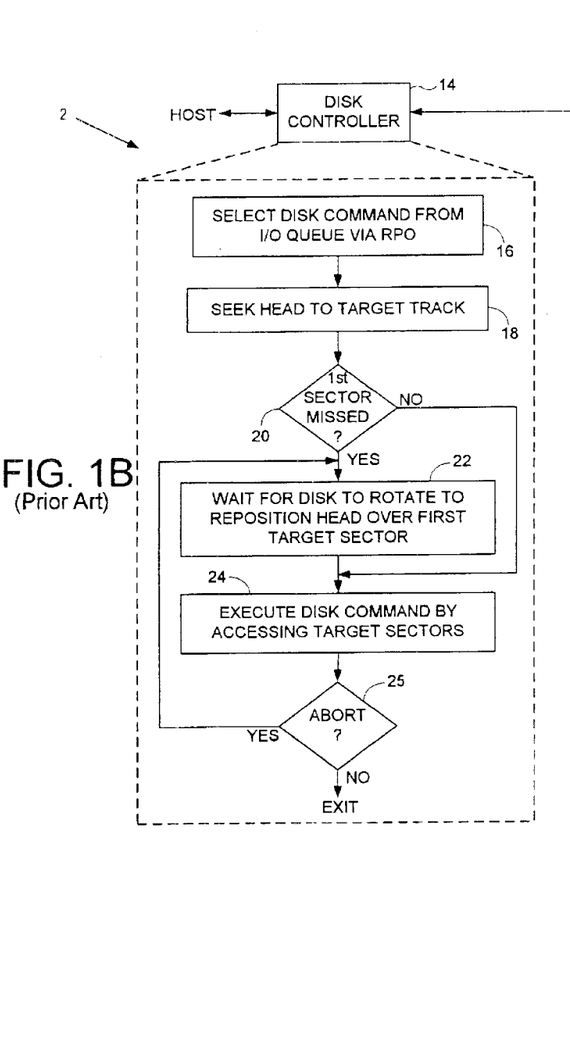
FIG. 1B illustrates how the prior art disk drive of FIG. 1A waits a revolution if the first target data sector of the current disk command is missed or if the current disk command is aborted.

FIG. 1B shows a flow diagram of the steps executed by the disk controller 14 while executing a disk command. At step 16, a disk command is selected from the I/O queue according to the RPO algorithm (as determined from the current radial and circumferential location of the head 8 and other commands in the I/O queue). At step 18, the disk controller 14 seeks the head 8 to a target track comprising target data sectors to be read/written. Ideally the head 8 will reach the target track at the end of a seek immediately preceding the first target data sector in order to minimize the rotational latency while waiting for the first target data sector to reach the head 8. However, due to various system dynamics the seek may be delayed causing the head 8 to reach the target track after the head 8 as already passed the first target data sector. If at step 20 the head 8 has missed the first target data sector (identified by START in FIG. 1A), then at step 22 the disk drive waits for the disk 4 to rotate until the head 8 is positioned over the first target data sector and then at step 24 reads/writes the data from/to the target data sectors (from START to STOP in FIG. 1A). Waiting for the disk to complete a revolution when the first target data sector is missed is undesirable since it increase the average access time of the disk drive. The RPO algorithm may be implemented with conservative seek time estimates to ensure the head 8 arrives at the target track ahead of the first target data sector, but this reduces the benefit derived from the RPO algorithm.

U.S. Pat. No. 5,991,825 discloses a disk drive which avoids missing a revolution when the first target data sector is missed by performing a secondary disk command in place of the current disk command. An RPO algorithm is executed to select a primary disk command from an I/O queue as well as a secondary disk command. A seek is then performed to the target data sector of the primary disk command, and if the head arrives late so that the first target data sector is missed, a seek is performed to the target data sector of the secondary disk command. In this manner the RPO algorithm can be implemented with more aggressive seek time estimates to minimize the rotational latency once the head reaches the target track. However, whenever the first target data sector of the primary disk command is missed and the secondary disk command executed, the latency in seeking to the primary disk command degrades performance.

Referring again to FIG. 1B, while executing the disk command at step 24 an error may occur (such as a physical shock to the disk drive) which causes the disk command to abort at step 25. If this happens control branches to step 22 where the disk drive again waits for the disk 4 to rotate to position the head 8 over the first target data sector and at step 24 re-executes the disk command. Again, waiting for the disk 4 to complete a revolution is undesirable since it increase the average access time of the disk drive.

There is, therefore, a need for a disk drive which improve performance when a first target data sector of a disk command is missed or when a disk command is aborted.

SUMMARY OF THE INVENTION

The present invention may be regarded as a disk drive comprising a disk having a plurality of concentric tracks, each track comprising a plurality of data sectors. A head is actuated radially over the disk. An input/output queue stores disk commands associated with host commands received from a host computer. A disk controller executes the disk commands stored in the input/output queue in an order determined from a rotational positioning optimization (RPO) algorithm. A plurality of the disk commands stored in the input/output queue are linked together to generate a linked disk command if the plurality of disk commands access near sequential data sectors. A current disk command is selected from the input/output queue according to the RPO algorithm, the current disk command identifying a plurality of target data sectors. A seek is performed to seek the head to a first target track comprising the target data sectors. If an error occurs while executing the current disk command and the current disk command is the linked disk command, at least one of the disk commands of the linked disk command is executed by accessing at least one of the target data sectors, and at least one of the unexecuted disk commands of the linked disk command is inserted into the input/output queue.

In one embodiment, the plurality of disk commands of the linked disk command comprises a first disk command and a second disk command, and the plurality of target data sectors comprise a first target data sector and a last target data sector. If the head arrives at the first target track behind the first target data sector and the current disk command is the linked disk command, the second disk command of the linked disk command is executed by accessing at least the last target data sector, and the first disk command of the linked disk command is inserted into the input/output queue wherein the first disk command identifies at least one target data sector in the first target track including the first target data sector. In one embodiment a next disk command is selected from the input/output queue in an order determined from the RPO algorithm. A seek operation is performed to seek the head from the first target track to a second target track identified by the next disk command and the next disk command is executed. Eventually the first disk command is selected from the input/output queue in an order determined from the RPO algorithm. A seek operation is performed to seek the head to the first target track and the first disk command is executed.

In another embodiment, if the linked disk command is aborted after executing the first disk command, the second disk command of the linked disk command is inserted into the input/output queue, wherein the second disk command identifies at least one target data sector in the first target track including the last target data sector. In one embodiment a next disk command is selected from the input/output queue in an order determined from the RPO algorithm. A seek operation is performed to seek the head from the first target track to a second target track identified by the next disk command and the next disk command is executed. Eventually the second disk command is selected from the input/output queue in an order determined from the RPO algorithm. A seek operation is performed to seek the head to the first target track and the second disk command is executed.

In one embodiment, the first disk command comprises a next command pointer which points to the second disk command thereby generating the linked disk command.

In yet another embodiment, the disk drive further comprises a cache memory for storing user data associated with the disk commands. Each disk command comprises a pointer to the cache memory for storing user data associated with the disk command, and each disk command comprises an allocation state identifying an allocation state of the cache memory allocated to the disk command. The allocation state is selected from the group comprising at least:

free—an unallocated cache segment;
available—an allocated cache segment storing write data that has been written to the disk;
valid—an allocated cache segment storing cached read data; and
dirty—an allocated cache segment storing write data not yet written to the disk.

The disk commands having the same allocation state are linked to generate a linked disk command.

In one embodiment, the first and second disk commands linked to generate the linked disk command are write commands. The allocation state of the first and second disk commands prior to execution is assigned dirty, and after executing the first disk command the allocation state of the first disk command is changed to available, thereby preventing the first disk command from being re-linked to the second disk command.

The present invention may also be regarded as a method for accessing a disk in a disk drive, the disk having a plurality of concentric tracks, each track comprising a plurality of data sectors. The disk drive comprising a head actuated radially over the disk, and an input/output queue for storing disk commands associated with host commands received from a host computer. A plurality of the disk commands stored in the input/output queue are linked to generate a linked disk command if the plurality of disk commands access near sequential data sectors. A current disk command is selected from the input/output queue according to a rotational position optimization (RPO) algorithm, wherein the current disk command identifies a plurality of target data sectors. A seek operation seeks the head to a first target track comprising the target data sectors. If an error occurs while executing the current disk command and the current disk command is the linked disk command, at least one of the disk commands of the linked disk command is executed by accessing at least one of the target data sectors, and at least one of the unexecuted disk commands of the linked disk command is inserted into the input/output queue.

DESCRIPTION OF THE PREFERRED EMBODIMENTS

Figure 2A:
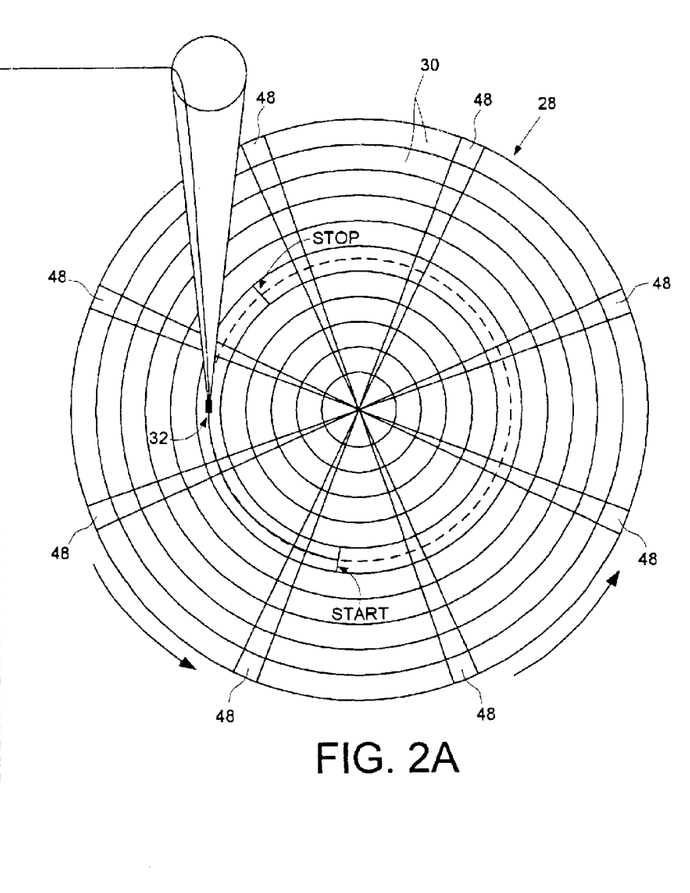
FIG. 2A shows a disk drive according to an embodiment of the present invention.

FIG. 2A shows a disk drive 26 according to an embodiment of the present invention comprising a disk 28 having a plurality of concentric tracks 30, each track 30 comprising a plurality of data sectors. A head 32 is actuated radially over the disk 28. An input/output queue stores disk commands associated with host commands received from a host computer. A disk controller 34 executes the disk commands stored in the input/output queue in an order determined from a rotational positioning optimization (RPO) algorithm. A plurality of the disk commands stored in the input/output queue are linked together to generate a linked disk command if the plurality of disk commands access near sequential data sectors.

Figure 2B:
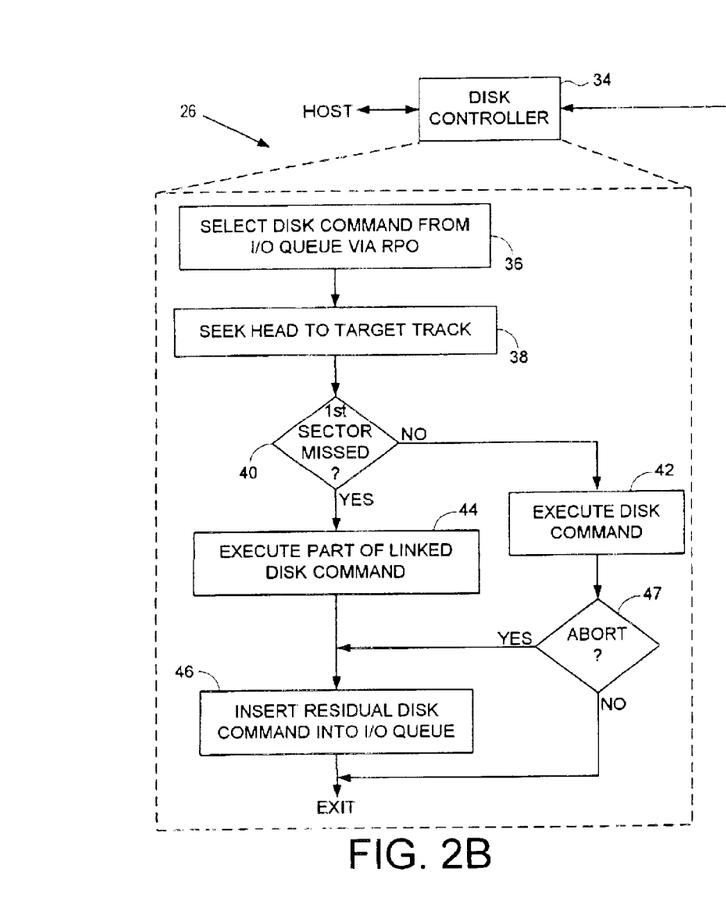
FIG. 2B illustrates how the disk drive of FIG. 2A executes part of a linked disk command if the first target data sector is missed, or if the linked disk command is aborted, thereby avoiding the rotational latency of the prior art disk drive in FIG. 1A.

FIG. 2B is a flow diagram executed by the disk controller 34 according to an embodiment of the present invention wherein the plurality of disk commands of the linked disk command comprises a first disk command and a second disk command. At step 36 a current disk command is selected from the input/output queue according to the RPO algorithm, the current disk command identifying a plurality of target data sectors including a first target data sector and a last target data sector. At step 38 a seek is performed to seek the head 32 to a first target track comprising the target data sectors. If at step 40 the head 32 arrives at the first target track ahead of the first target data sector, then at step 42 the current disk command is executed by accessing the target data sectors including the first and last target data sectors. If at step 40 the head arrives at the first target track behind the first target data sector and the current disk command is the linked disk command, then at step 44 the second disk command of the linked disk command is executed by accessing at least the last target data sector, and at step 46 the first disk command of the linked disk command is inserted into the input/output queue wherein the first disk command identifies at least one target data sector in the first target track including the first target data sector. If while executing the linked disk command at step 42 the linked disk command is aborted at step 47 after executing the first disk command of the linked disk command, then at step 46 the second disk command of the linked disk command is inserted into the input/output queue wherein the second disk command identifies at least one target data sector in the first target track including the last target data sector.

In the embodiment of FIG. 2A, each track 30 comprises a plurality of embedded servo sectors 48 recorded at a periodic interval around the circumference of the track 30. Each embedded servo sector 48 comprises coarse head positioning information (e.g., a track number) processed by the disk controller 34 to position the head 32 over a target track, and fine head positioning information (e.g., servo bursts) processed by the disk controller 34 to maintain the head 32 over a centerline of the target track during read and write operations. The disk 28 shown in FIG. 2A comprises radially spaced, concentric tracks 30, however, any suitable track format may be employed including a spiral track format. Further, the sector identification (ID) data may be stored in any suitable manner, such as within each data sector or within the embedded servo sectors 48. The sector ID data is processed by the disk controller 34 to determine the circumferential location of the head 32 and thereby determine whether the head 32 has missed the first target data sector at step 40 of FIG. 2B.

Figure 3:
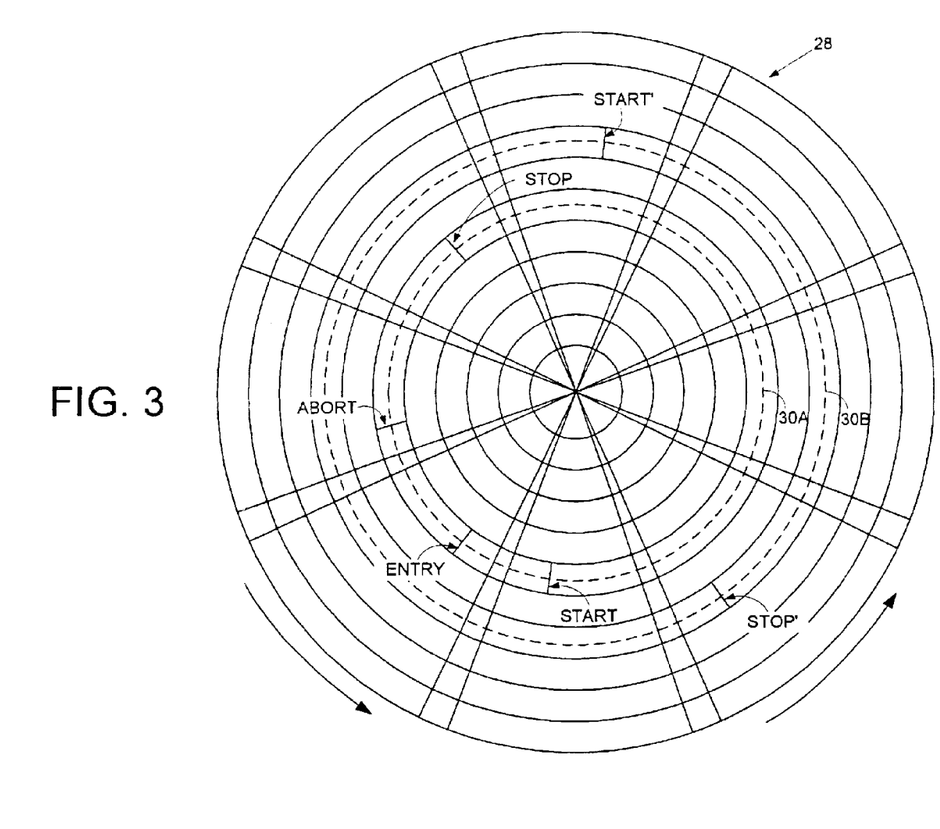
FIG. 3 illustrates how the disk drive of FIG. 2A executes a next disk command after executing part of the linked disk command, and then eventually finishes executing the residual of the linked disk command.

FIG. 3 illustrates an embodiment wherein the first and second disk commands of the linked disk command access target data sectors recorded on the first target track 30A from START to STOP. If the head 32 arrives at the first target track 30A behind the first target data sector (arrives at ENTRY rather than ahead of START), the second disk command is executed by accessing the target data sectors through STOP on the first target track 30A, the first disk command identifying at least the first target data sector is inserted into the input/output queue, and a next disk command is selected from the input/output queue in an order determined from the RPO algorithm. After executing the second disk command, a seek operation is performed to seek the head 32 from the first target track 30A to a second target track 30B identified by the next disk command, and the next disk command is executed by accessing the target data sectors from START' to STOP'. Eventually the first disk command is selected from the input/output queue in an order determined from the RPO algorithm. A seek operation is performed to seek the head 32 back to the first target track 30A and the first disk command is executed by accessing at least the first target data sector of the linked disk command (identified by START).

The head 32 may arrive at the first target track 30A ahead of the first target data sector (prior to START), but the linked disk command aborted at ABORT after executing the first disk command by accessing at least the first target data sector in the first target track 30A. If so, the second disk command identifying at least the last target data sector is inserted into the input/output queue, and a next disk command is selected from the input/output queue in an order determined from the RPO algorithm. A seek operation is performed to seek the head 32 from the first target track 30A to a second target track 30B identified by the next disk command, and the next disk command is executed by accessing the target data sectors from START' to STOP'.

Eventually the second disk command is selected from the input/output queue in an order determined from the RPO algorithm. A seek operation is performed to seek the head 32 back to the first target track 30A and the second disk command is executed by accessing at least the last target data sector of the linked disk command (identified by STOP).

Figure 4A:
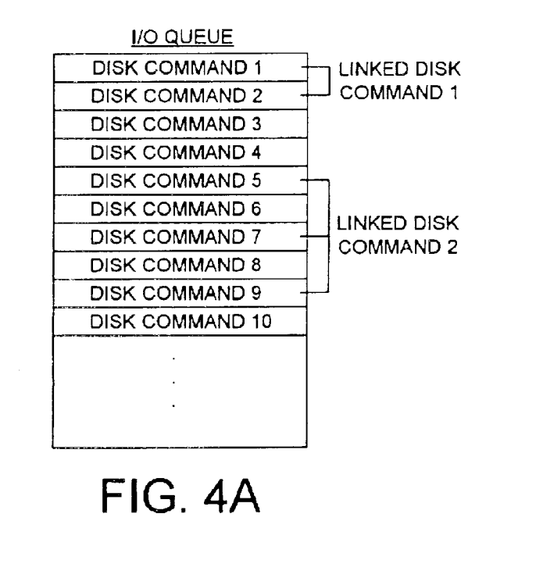
FIG. 4A shows an input/output queue storing linked disk commands according to an embodiment of the present invention.

Any suitable data structure may be employed to implement the input/output queue, such as an array or linked list of disk commands. FIG. 4A shows an embodiment wherein the input/output queue stores a plurality of disk commands wherein disk commands 1 and 2 are linked together to form a first linked disk command and disk commands 5, 7 and 9 are linked together to form a second linked disk command. When selecting a next disk command to execute from the input/output queue according to the RPO algorithm, the linked disk commands are considered a single disk command. For example, the RPO algorithm will consider the sectors accessed by disk command 5 and ignore the sectors accessed by disk commands 7 and 9 when determining which disk command to execute next. If the RPO algorithm selects disk command 5 to execute next, then the linked disk commands 7 and 9 are also selected and executed together with disk command 5. Any suitable RPO algorithm may be implemented by the disk controller 34 in the embodiments of the present invention. In general, an RPO algorithm evaluates the mechanical latency of the disk drive (seek and rotational latencies) in order to select disk commands from the input/output queue in an order which minimizes the latency.

Figure 4B:
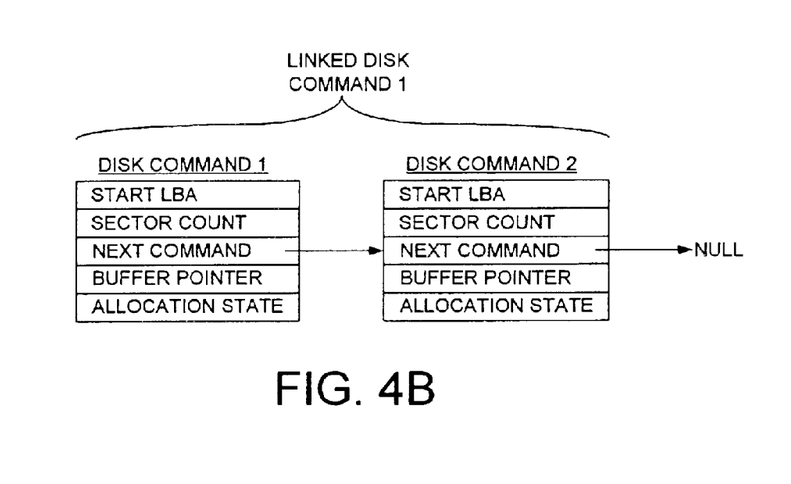
FIG. 4B shows a format of a disk command according to an embodiment of the present invention.

The disk commands generated from the host commands and stored in the input/output queue may comprise any suitable format, an example embodiment for which is shown in FIG. 4B. In this embodiment, disk command 1 comprises a start logical block address (LBA) identifying a logical address of the first target data sector, a sector count identifying the number of data sectors to access, a next command pointer which points to a next disk command if linked (disk command 2 in this example), a buffer pointer which points to a memory segment within a cache buffer allocated to the disk command, and an allocation state. The next command pointer of disk command 2 is assigned NULL since it is the last disk command in the linked disk command.

Figure 4C:
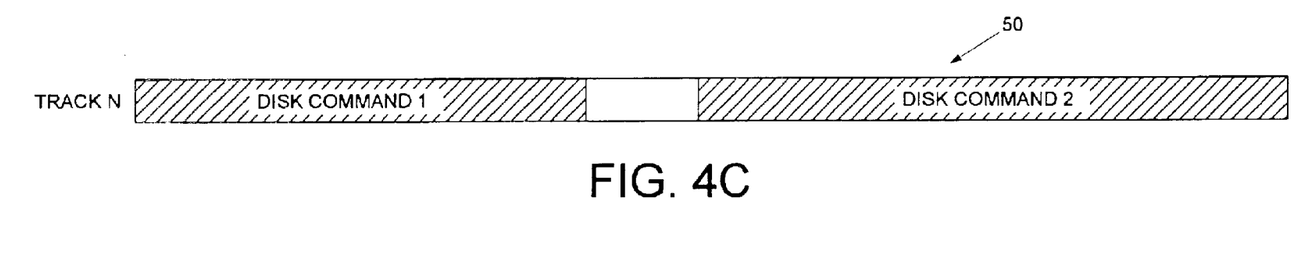
FIG. 4C illustrates a first and second disk commands being linked since they access near sequential data sectors from a target track.

FIG. 4C illustrates the data sectors accessed on the first target track 50 by disk command 1 and disk command 2. Because the data sectors accessed by each disk command are located proximate one another, the disk commands are considered near sequential and therefore linked to generate a linked disk command. Although in the embodiment of FIG. 4C disk command 1 and disk command 2 identify target data sectors on the same target track (first target track 50), in an alternative embodiment disk command 2 identifies target data sectors on a second target track located near the first target track. If while executing the linked disk command the first target data sector is missed, the disk drive will skip disk command 1 but still execute disk command 2. Disk command 1 is then re-inserted into the input/output queue so that it will be re-selected via the RPO algorithm and executed at a later time. Similarly, if while executing the linked disk command the command is aborted after executing disk command 1, disk command 2 is re-inserted into the input/output queue so that it will be re-selected via the RPO algorithm and executed at a later time.

Figure 5:
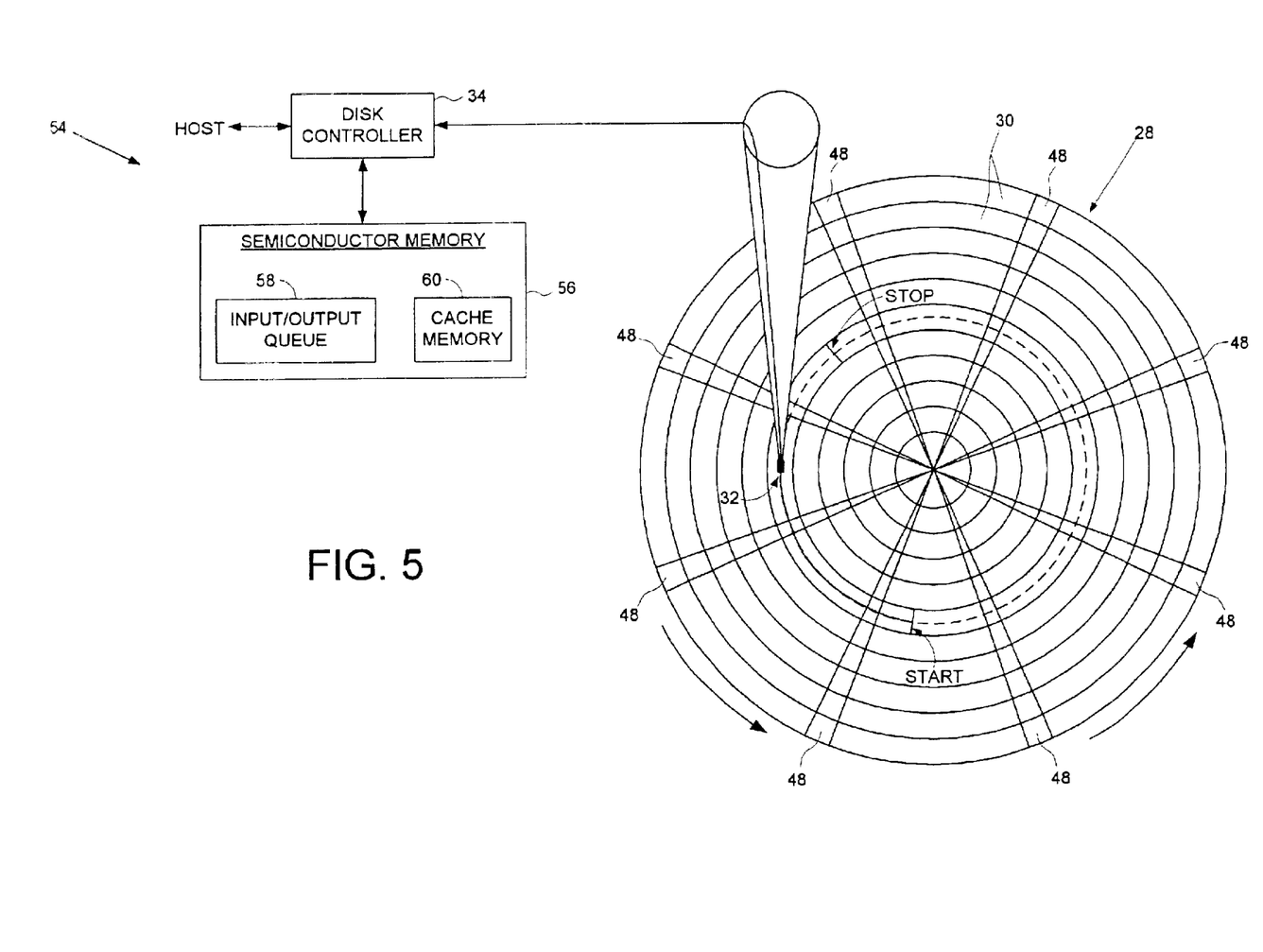
FIG. 5 shows a disk drive according to an embodiment of the present invention comprising a semiconductor memory for storing the input/output queue and a cache memory.

FIG. 5 shows a disk drive 54 according to an embodiment of the present invention comprising a semiconductor memory 56 for storing the input/output queue 58 and a cache memory 60 for storing user data associated with the disk commands. Each disk command comprises a pointer to the cache memory (FIG. 4B) for storing user data associated with the disk command, and each disk command comprises an allocation state identifying an allocation state of the cache memory allocated to the disk command. The allocation state is selected from the group comprising at least:

free—an unallocated cache segment;

available—an allocated cache segment storing write data that has been written to the disk;

valid—an allocated cache segment storing cached read data; and dirty—an allocated cache segment storing write data not yet written to the disk.

In one embodiment, the disk commands that access near sequential data sectors and which have the same allocation state are linked to generate a linked disk command. For example, if disk command 1 and disk command 2 in FIG. 4C are write commands, the allocation state for both disk commands prior to execution is assigned dirty. If while executing the linked disk command the first target data sector is missed, then after executing disk command 2 the disk controller 34 changes the allocation state of disk command 2 to available, thereby preventing disk command 2 from being re-linked to disk command 1.

Figure 6:
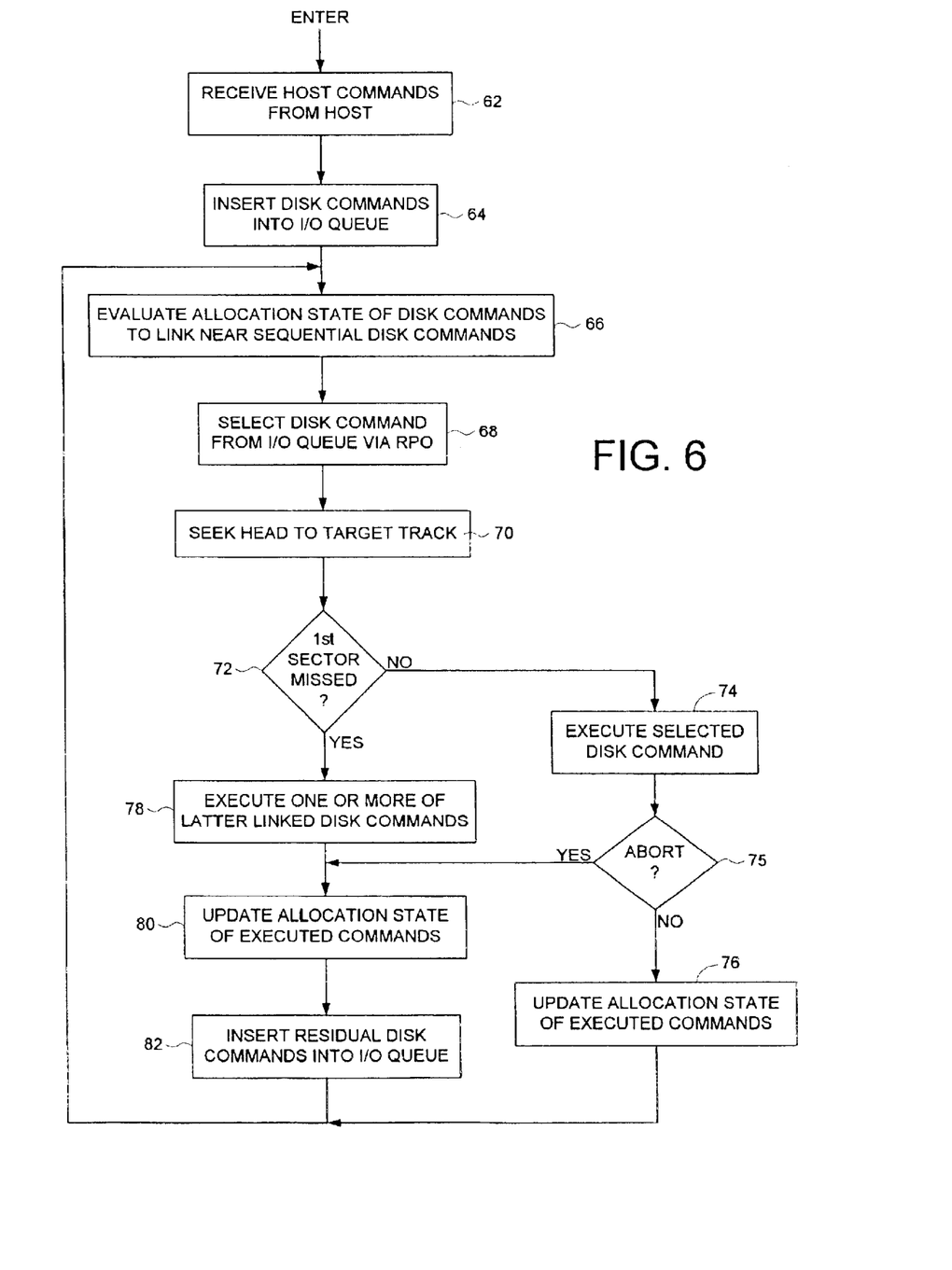
FIG. 6 is a flow diagram illustrating how host commands are received from a host, converted into disk commands, linking near sequential disk commands having a common allocation state, and executing the disk commands including partial linked disk commands when the first target data sector is missed or when a linked disk command is aborted.

FIG. 6 is a flow diagram executed by the disk controller 34 according to an embodiment of the present invention. At step 62 host commands are received from a host computer (e.g., read and write commands), and at step 64, the host commands are converted into disk commands which are inserted into the input/output queue. At step 66 near sequential disk commands having the same allocation state are linked into linked disk commands. At step 68 a current disk command is selected from the input/output queue via the RPO algorithm, and at step 70 a seek operation seeks the head 32 to the target track for the current disk command. If at step 72 the head 32 arrives at the target track ahead of the first target data sector, then at step 74 the current disk command is executed, including any linked disk commands. If at step 75 the current disk command is aborted after executing a linked disk command (e.g., disk command 1 in FIG. 4C), then at step 80 the execution state of the executed linked disk commands are updated, and at step 82 the residual linked disk commands (e.g., disk command 2 in FIG. 4C) are inserted back into the input/output queue without changing the allocation state. Eventually the residual disk commands inserted into the input/output queue at step 82 are selected for execution at step 68. If the current disk command is not aborted at step 75, then at step 76 the allocation state of the executed linked disk commands are updated and control branches to step 66.

If at step 72 the head 32 arrives at the target track behind the first target data sector, then at step 78 at least one of the latter linked disk commands is executed (e.g., disk command 2 in FIG. 4C). At step 80 the allocation state of the executed disk commands are updated, and at step 82 the residual linked disk commands (e.g., disk command 1 in FIG. 4C) that were not executed are inserted back into the input/output queue without changing the allocation state. Control then loops back to step 66 wherein the disk commands in the input/output queue are re-evaluated in order to link near sequential disk commands having the same allocation state. Eventually the residual disk commands inserted into the input/output queue at step 82 are selected for execution at step 68.

I claim:

1. A disk drive comprising:

(a) a disk comprising a plurality of concentric tracks, each track comprising a plurality of data sectors;

(b) a head actuated radially over the disk;

(c) an input/output queue for storing disk commands associated with host commands received from a host computer;

(d) a disk controller for executing the disk commands stored in the input/output queue in an order determined from a rotational positioning optimization (RPO) algorithm, the disk controller for performing the steps of:

linking together first disk command and a second disk command stored in the input/output queue to generate a linked disk command if the first and second disk commands access near sequential data sectors;

computing an access latency for the linked disk command and at least one other disk command in the command queue, wherein the access latency for the linked disk command is computed as an access latency for the first disk command without computing an access latency for the second disk command;

selecting a current disk command from the input/output queue according to the access latencies, the current disk command identifying a plurality of target data sectors;

seeking the head to a first target track comprising the target data sectors; and if an error occurs while executing the current disk command and the current disk command is the linked disk command:

executing at least one of the disk commands of the linked disk command by accessing at least one of the target data sectors; and inserting at least one of the unexecuted disk commands of the linked disk command into the input/output queue.

2. The disk drive as recited in claim 1, wherein:

(a) the plurality of target data sectors comprise a first target data sector and a last target data sector;

(b) the error that occurs while executing the linked disk command comprises the head arriving at the first target track behind the first target data sector;

(c) the step of executing at least one of the disk commands of the linked disk command comprises the step of executing the second disk command of the linked disk command by accessing at least the last target data sector; and (d) the step of inserting at least one of the unexecuted disk commands of the linked disk command into the input/output queue comprises the step of inserting the first disk command of the linked disk command into the input/output queue, the first disk command identifying at least one target data sector in the first target track including the first target data sector.

3. The disk drive as recited in claim 2, wherein the disk controller for performing the additional steps of:

(a) selecting a next disk command from the input/output queue in an order determined from the RPO algorithm;

(b) seeking the head from the first target track to a second target track identified by the next disk command;

(c) executing the next disk command;

(d) selecting the first disk command from the input/output queue in an order determined from the RPO algorithm;

(e) seeking the head to the first target track; and (f) executing the first disk command.

4. The disk drive as recited in claim 1, wherein:

(a) the plurality of target data sectors comprise a first target data sector and a last target data sector;

(b) the error that occurs while executing the linked disk command causes the linked disk command to be aborted after executing the first disk command;

(c) the step of inserting at least one of the unexecuted disk commands of the linked disk command into the input/output queue comprises the step of inserting the second disk command of the linked disk command into the input/output queue, the second disk command identifying at least one target data sector in the first target track including the last target data sector.

5. The disk drive as recited in claim 4, wherein the disk controller for performing the additional steps of:

(a) selecting a next disk command from the input/output queue in an order determined from the RPO algorithm;

(b) seeking the head from the first target track to a second target track identified by the next disk command;

(c) executing the next disk command;

(d) selecting the second disk command from the input/output queue in an order determined from the RPO algorithm;

(e) seeking the head to the first target track; and (f) executing the second disk command.

6. The disk drive as recited in claim 2, wherein the first disk command comprises a next command pointer which points to the second disk command thereby generating the linked disk command.

7. The disk drive as recited in claim 4, wherein the first disk command comprises a next command pointer which points to the second disk command thereby generating the linked disk command.

8. The disk drive as recited in claim 2, further comprising a cache memory for storing user data associated with the disk commands, wherein:

(a) each disk command comprises a pointer to the cache memory for storing user data associated with the disk command;

(b) each disk command comprises an allocation state identifying an allocation state of the cache memory allocated to the disk command, the allocation state selected from the group comprising at least:
free—an unallocated cache segment;
available—an allocated cache segment storing write data that has been written to the disk;
valid—an allocated cache segment storing cached read data; and
dirty—an allocated cache segment storing write data not yet written to the disk; and (c) the step of linking together disk commands comprises the step of linking together disk commands having the same allocation state.

9. The disk drive as recited in claim 8, wherein the disk controller for performing the additional step of changing the allocation state of the second disk command after executing the second disk command.

10. The disk drive as recited in claim 9, wherein:

(a) the first and second disk commands are write commands;

(b) the allocation state of the first and second disk commands prior to execution is dirty; and (c) the step of changing the allocation state of the second disk command after executing the second disk command comprises the step of changing the allocation state of the second disk command to available, thereby preventing the second disk command from being re-linked to the first disk command.

11. The disk drive as recited in claim 4, further comprising a cache memory for storing user data associated with the disk commands, wherein:

(a) each disk command comprises a pointer to the cache memory for storing user data associated with the disk command;

(b) each disk command comprises an allocation state identifying an allocation state of the cache memory allocated to the disk command, the allocation state selected from the group comprising at least:
free—an unallocated cache segment;
available—an allocated cache segment storing write data that has been written to the disk;
valid—an allocated cache segment storing cached read data; and
dirty—an allocated cache segment storing write data not yet written to the disk; and (c) the step of linking together disk commands comprises the step of linking together disk commands having the same allocation state.

12. The disk drive as recited in claim 11, wherein the disk controller for performing the additional step of changing the allocation state of the first disk command after executing the first disk command.

13. The disk drive as recited in claim 12, wherein:

(a) the first and second disk commands are write commands;

(b) the allocation state of the first and second disk commands prior to execution is dirty; and (c) the step of changing the allocation state of the first disk command after executing the first disk command comprises the step of changing the allocation state of the first disk command to available, thereby preventing the first disk command from being re-linked to the second disk command.

14. A method for accessing a disk in a disk drive, the disk comprising a plurality of concentric tracks, each track comprising a plurality of data sectors, the disk drive comprising a head actuated radially over the disk, and an input/output queue for storing disk commands associated with host commands received from a host computer, the method comprising the steps of:

(a) linking together a first disk command and a second disk command stored in the input/output queue to generate a linked disk command if the first and second disk commands access near sequential data sectors;

(b) computing an access latency for the linked disk command and at least one other disk command in the command queue, wherein the access latency for the linked disk command is computed as an access latency for the first disk command without computing an access latency for the second disk command;

(c) selecting a current disk command from the input/output queue according to a access latencies, the current disk command identifying a plurality of target data sectors;

(d) seeking the head to a first target track comprising the target data sectors; and (e) if an error occurs while executing the current disk command and the current disk command is the linked disk command:
executing at least one of the disk commands of the linked disk command by accessing at least one of the target data sectors; and
inserting at least one of the unexecuted disk commands of the linked disk command into the input/output queue.

15. The method as recited in claim 14, wherein:
(a) the plurality of target data sectors comprise a first target data sector and a last target data sector;
(b) the error that occurs while executing the linked disk command comprises the head arriving the first target track behind the first target data sector;
(c) the step of executing at least one of the disk commands of the linked disk command comprises the step of executing the second disk command of the linked disk command by accessing at least the last target data sector; and
(d) the step of inserting at least one of the unexecuted disk commands of the linked disk command into the input/output queue comprises the step of inserting the first disk command of the linked disk command into the input/output queue, the first disk command identifying at least one target data sector in the first target track including the first target data sector.

16. The method as recited in claim 15, further comprising the steps of:
(a) selecting a next disk command from the input/output queue in an order determined from the RPO algorithm;
(b) seeking the head from the first target track to a second target track identified by the next disk command;
(c) executing the next disk command;
(d) selecting the first disk command from the input/output queue in an order determined from the RPO algorithm;
(e) seeking the head to the first target track; and
(f) executing the first disk command.

17. The method as recited in claim 14, wherein:
(a) the plurality of target data sectors comprise a first target data sector and a last target data sector;
(b) the error that occurs while executing the linked disk command causes the linked disk command to be aborted after executing the first disk command;
(c) the step of inserting at least one of the unexecuted disk commands of the linked disk command into the input/output queue comprises the step of inserting the second disk command of the linked disk command into the input/output queue, the second disk command identifying at least one target data sector in the first target track including the last target data sector.

18. The method as recited in claim 17, further comprising the steps of:
(a) selecting a next disk command from the input/output queue in an order determined from the RPO algorithm;
(b) seeking the head from the first target track to a second target track identified by the next disk command;
(c) executing the next disk command;
(d) selecting the second disk command from the input/output queue in an order determined from the RPO algorithm;
(e) seeking the head to the first target track; and
(f) executing the second disk command.

19. The method as recited in claim 15, wherein the first disk command comprises a next command pointer which points to the second disk command thereby generating the linked disk command.

20. The method as recited in claim 17, wherein the first disk command comprises a next command pointer which points to the second disk command thereby generating the linked disk command.

21. The method as recited in claim 15, wherein:
(a) the disk drive further comprises a cache memory for storing user data associated with the disk commands;
(b) each disk command comprises a pointer to the cache memory for storing user data associated with the disk command;
(c) each disk command comprises an allocation state identifying an allocation state of the cache memory allocated to the disk command, the allocation state selected from the group comprising at least:
free—an unallocated cache segment;
available—an allocated cache segment storing write data that has been written to the disk;
valid—an allocated cache segment storing cached read data; and
dirty—an allocated cache segment storing write data not yet written to the disk; and
(d) the step of linking together disk commands comprises the step of linking together disk commands having the same allocation state.

22. The method as recited in claim 21, further comprising the step of changing the allocation state of the second disk command after executing the second disk command.

23. The method as recited in claim 22, wherein:
(a) the first and second disk commands are write commands;
(b) the allocation state of the first and second disk commands prior to execution is dirty; and
(c) the step of changing the allocation state of the second disk command after executing the second disk command comprises the step of changing the allocation state of the second disk command to available, thereby preventing the second disk command from being re-linked to the first disk command.

24. The method as recited in claim 17, wherein:
(a) the disk drive further comprises a cache memory for storing user data associated with the disk commands;
(b) each disk command comprises a pointer to the cache memory for storing user data associated with the disk command;
(c) each disk command comprises an allocation state identifying an allocation state of the cache memory allocated to the disk command, the allocation state selected from the group comprising at least:
free—an unallocated cache segment;
available—an allocated cache segment storing write data that has been written to the disk;
valid—an allocated cache segment storing cached read data; and
dirty—an allocated cache segment storing write data not yet written to the disk; and
(d) the step of linking together disk commands comprises the step of linking together disk commands having the same allocation state.

25. The method as recited in claim 24, further comprising the step of changing the allocation state of the first disk command after executing the first disk command.

26. The method as recited in claim 25, wherein:
(a) the first and second disk commands are write commands;
(b) the allocation state of the first and second disk commands prior to execution is dirty; and
(c) the step of changing the allocation state of the first disk command after executing the first disk command comprises the step of changing the allocation state of the first disk command to available, thereby preventing the first disk command from being re-linked to the second disk command.

* * * * *